United States Patent
Krasso et al.

(10) Patent No.: US 11,558,435 B1
(45) Date of Patent: Jan. 17, 2023

(54) CONFERENCE MANAGEMENT

(71) Applicant: West Corporation, Omaha, NE (US)

(72) Inventors: William F. Krasso, Valley, NE (US);
Marcus Hurst, Fremont, NE (US);
Alan Naumann, Omaha, NE (US);
Kannan Panathula, Bengaluru (IN)

(73) Assignee: WEST CORPORATION, Omaha, NE (US)

( * ) Notice: Subject to any disclaimer, the term of this patent is extended or adjusted under 35 U.S.C. 154(b) by 646 days.

(21) Appl. No.: 16/697,183

(22) Filed: Nov. 27, 2019

(51) Int. Cl.
*H04L 65/403* (2022.01)
*H04L 9/40* (2022.01)

(52) U.S. Cl.
CPC .......... *H04L 65/403* (2013.01); *H04L 63/102* (2013.01)

(58) Field of Classification Search
CPC ............................ H04L 63/102; H04L 65/403

USPC ........................................................ 709/204
See application file for complete search history.

(56) References Cited

U.S. PATENT DOCUMENTS

| | | | |
|---|---|---|---|
| 11,228,597 B2 * | 1/2022 | Kumar | G06F 21/6209 |
| 2020/0389506 A1 * | 12/2020 | Rakshit | H04L 65/1083 |
| 2021/0076001 A1 * | 3/2021 | Periyannan | H04L 63/029 |

* cited by examiner

*Primary Examiner* — Frantz B Jean

(57) ABSTRACT

To enable clients to self-manage service issues for conferences on a bridge operated by a conference provider, there is provided a web based interface. Companies are provisioned in a client database as receiving client managed conference services instead of provider managed conference services. Users of the company or client of the Provider may log in to a web interface through a company or client specific URL and be presented with an interface that enables the user to view and perform management functions for conferences on a bridge that relate to that user only.

20 Claims, 6 Drawing Sheets

CONFERENCE MANAGEMENT

FIELD OF THE INVENTION

This disclosure relates to systems and methods for providing conferences to users and for providing support services to conferences of an enterprise.

BACKGROUND OF THE INVENTION

Audio conference providers provide a range of hardware and software, in particular audio bridges, that enables their clients to run audio conferences for multiple participants. Typically, the provider is responsible for providing support services before, during, and after the conference. However, the Provider is not always the most appropriate entity to provide these support services. For example, the client is often best placed to know which participants should be authorized to join a conference. In many clients, the knowledge already exists to provide such support services. Further, there can be privacy issues for information conveyed during conference and thus it may be preferable for a client to not have to rely on third party support. However, there is no ready mechanism for a client to manage and support their own conferences. What is required is an improved system and method for providing conference management and support.

SUMMARY OF THE INVENTION

To enable clients to self-manage service issues for conferences on a bridge operated by a conference provider, there is provided a web based interface. Companies are provisioned in a client database as receiving client managed conference services instead of provider managed conference services. Users of the company or client of the Provider may log in to a web interface through a company or client specific URL and be presented with an interface that enables the user to view and perform management functions for conferences on a bridge that relate to that user only.

In one aspect of the disclosure, there is provided a method for providing conference management for a client of a conference services provider. The method may comprising initializing a client database of the conference services provider to identify one or more companies within the database that are to have conferences managed by the client instead of the conference services provider; provisioning, in the client database, one or more users from the client; receiving a login request from a user, the login request comprising user credentials; determining from the user credentials that the user is associated with one or more companies; and generating an interface that displays a management interface for one or more conferences on a bridge associated with the one or more companies associated to the user, wherein the interface allows the user to perform one or more management actions for the one or more conferences.

In one aspect of the disclosure, there is provided a system for providing conference management for a client of a conference services provide. The system may comprise at least one client database; at least one processor and operatively associated memory and at least one web server. The processor and memory may be programmed to initialize the client database of the conference services provider to identify one or more companies within the database that are to have conferences managed by the client instead of the conference services provider; and provision, in the client database, one or more users from the client. The at least one web server may be programmed to receive a login request from a user, the login request comprising user credentials; determine from the user credentials that the user is associated with one or more companies; and generate an interface that displays, for the user, a management interface for one or more conferences on a bridge associated with the one or more companies associated to the user, wherein the interface allows the user to perform one or more management actions for the one or more conferences.

In one aspect of the disclosure, there is provided a non-transitory computer readable medium comprising instructions, that when read by a processor, cause the processor to perform initializing a client database of the conference services provider to identify one or more companies within the database that are to have conferences managed by the client instead of the conference services provider; provisioning, in the client database, one or more users from the client; receiving a login request from a user, the login request comprising user credentials; determining from the user credentials that the user is associated with one or more companies; and generating an interface that displays a management interface for one or more conferences on a bridge associated with the one or more companies associated to the user, wherein the interface allows the user to perform one or more management actions for the one or more conferences.

BRIEF DESCRIPTION OF THE DRAWINGS

Reference will now be made, by way of example only, to specific embodiments and to the accompanying drawings in which.

DETAILED DESCRIPTION OF THE INVENTION

Conference management services have previously been provided by the conference provider. Typical conference management services provide an internal software and hardware system, e.g. a desktop application that is based upon LDAP login with Provider credentials that allows the user to see "ALL" conferences that exist on a given bridge across all clients and companies. The user typically has a drop-down whereby they can choose any of the audio bridges and see all clients and conferences on the selected bridge.

As outlined above, there can be many reasons why a client may wish to self-manage the conferences that their enterprise is involved in. It is a far different problem to restrict specific conferences for specific clients to only be viewable by that client and restrict them from being seen by the Provider operational staff. There will be described in detail below, a system and method that separates the data and restricts the access to client specific data such that only the authorized users have access and permissions, based upon roles, to manage the user's experience and conferences.

In the embodiments to be described below, specific reference will be made to the Applicant's proprietary term, Conference Attendant, which is a name for a client specific conference management tool.

The Conference Attendant application is a web product that takes advantage of the Internet and Cloud environments to provide operational support for audio conferences. Conference Attendant is meant to be used by those clients of the conference provider who want to provide their own operational support to their users of the Provider audio conferences. The application allows clients to manage and support their conferences as well as eliminating the access and requirement for the Provider's operational staff to have access to these conferences. When an audio client determines that Conference Attendant is an application they want to utilize for the support and added security to restrict who has access to their conferences their conferences are then hidden from access by the Provider's operational support staff.

Figure 1:
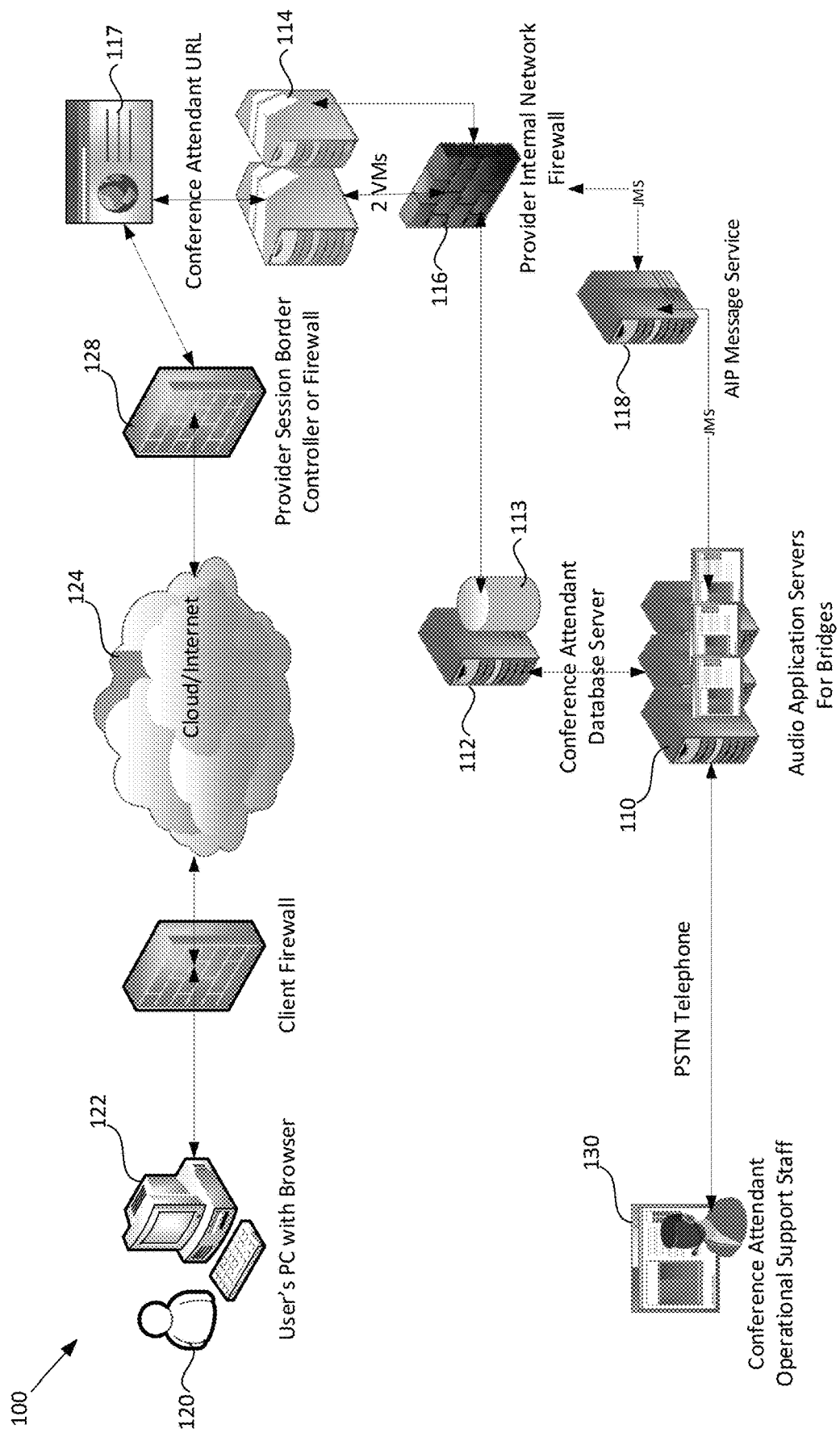
FIG. 1 shows a system diagram for conference management system.

A system architecture 100 for client management of client conferences hosted by a provider is shown in FIG. 1. The system 100 includes Provider side components including audio application servers for bridges 110 that are able to host audio conferences across the provider network. The servers may be distributed across as range of geographic locations. A conference attendant database server 112 provides information from entity database 113 relating to clients, companies within those clients, and conference attendants that are able to participate in audio conferences on the Provider bridges within the servers 110. Data within the servers 110 and the database server 112 can be accessed through virtual machines 114 or similar servers. A firewall 116 provides security and protection to the Provider side information. The system 100 further includes components and aspects on the client side. A user 120 from within a client who is to perform a role of conference management and support services is furnished with a user computer 122 with internet browsing capabilities. Through the internet 124 and a Session Border Controller 128 or similar firewall, the user is able to access the data servers 114 to retrieve client specific conference data through a Conference Attendant URL 117 and to execute management functions on those conferences. An AIP Message Service 118 is used to listen for and respond to messages and commands sent and received from Conference Attendant and audio bridge. These messages would be any action that would take place within the Conference Attendant UI; for example if the support staff needs to join a specific audio conference to help with an issue the participants are having with the audio conference.

Figure 2:
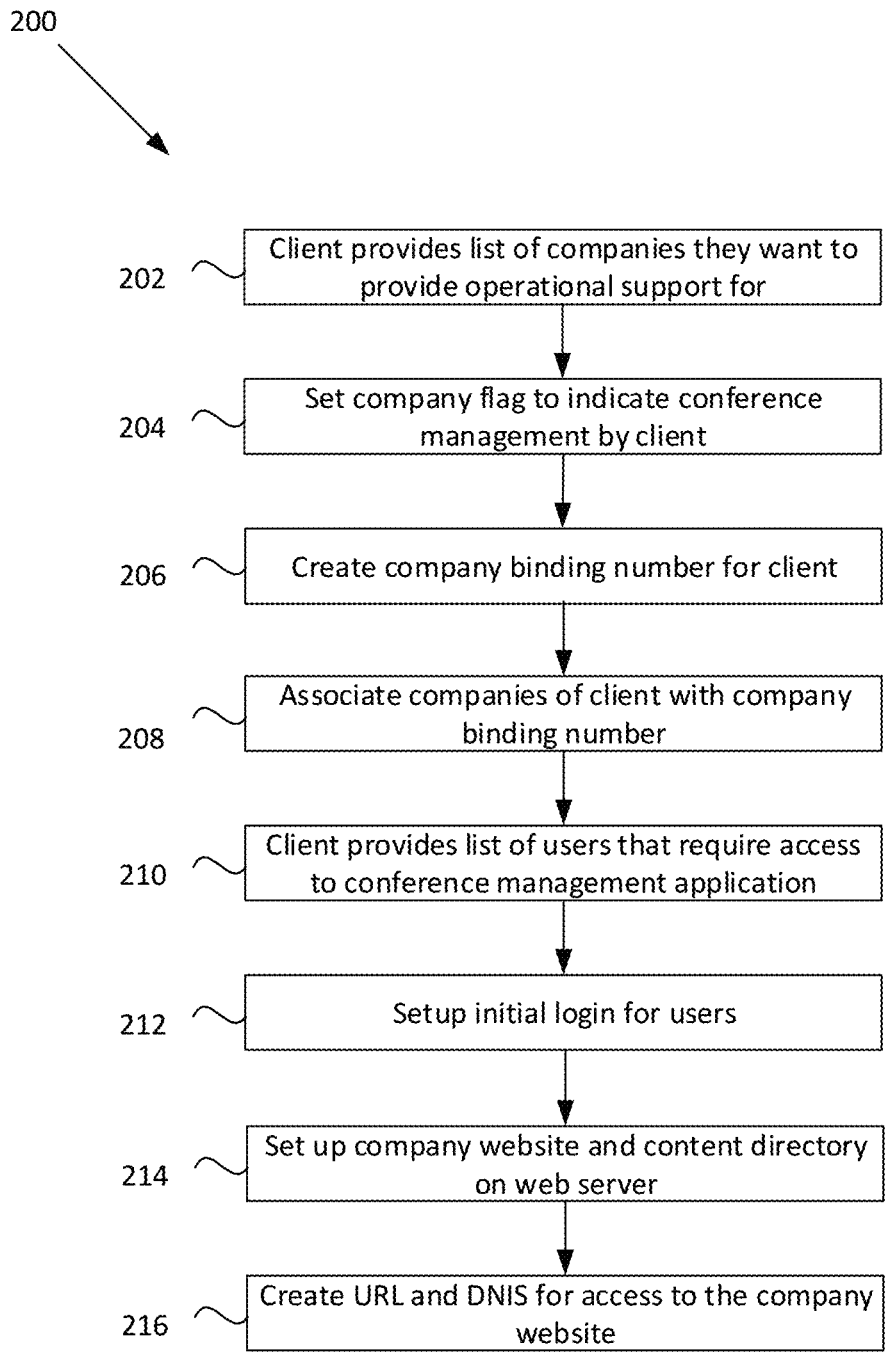
FIG. 2 shows a flowchart for provisioning aspects of the conference management system.

An initialization and provisioning process 200 is shown in FIG. 2. When utilizing this web product, the client works with the Provider, e.g. the Product, Sales, and Compliant teams to setup the usage of the application. At step 202, the client provides a list of their companies they want to provide the operational support for. At step 204, the database 113 is updated to set a flag for each specified company, that indicates that the client will provide the conference management services. The effect of the flag can be two-fold. First, this flag would be set to authorize and identify the companies associated with the use of conference management tool. Second, by establishing the company as being conference managed by the client, the flag also eliminates the requirement for the Provider's operational and management staff to have access to these conferences through the Provider's own conference management tools.

At step 206, a company binding number is created for a client. The company binding number is associated in the database 113 (step 208), with all the flagged provisioning company numbers for a client, i.e. the number that a participant calls to access a particular bridge, so that those conferences and owners would be available within the conference management tool for that client.

Because many clients of a Provider that utilize the Provider's audio conferences are global clients, this means that a conference attendee may land on any of the Provider's bridges globally. To be able to display these conferences to a specific client the only data to track the client is their assigned provisioning company number. Since many clients have different company numbers associated with each of their different office locations there is required a means to consolidate the numerous company numbers into a single identification that can then see all the conferences on all the bridges. With a global company and the need to support conferences within different time zones, the company numbers are consolidated to a specific geographical region and to a single bridge within that region that would ultimately be identified as the home bridge within that region. With these two pieces of information a client user of the application could be given access to their companies for a given audio conference bridge geographical region. Each client does need to be managed to both specific company numbers and those companies to specific bridge locations based upon geographical region. For example, a large client may have companies in US, EMEA, APAC, and Canada which would equate to access to at least four bridges.

In one embodiment, each company for a client will be provisioned to a single "Home" bridge. Thus, a non-global company would be limited to a single bridge within their geographical region. A global company would be setup to a single bridge in each required geographical region. The users would have to select a specific region to see their conferences within that region.

While a conference is assigned to a specific bridge, users can dial any phone number associated with their conference account that may land on a bridge closer to where they are physically located. For example, the owner of a specific conference account is normally in the US; however, they traveled for business to UK. It would be best for them if they could dial a number in the UK which would be answered on a bridge in the UK, which would then be linked to their home bridge in the US. Conference Attendant because it is designed to look for all conferences on a specific bridge, the host would be seen within Conference Attendant as in the conference on the US bridge.

Based upon the phone numbers that are associated with a given account; e.g. may exist around the world they would be shown in the appropriate audio conference on the appropriate bridge location that Conference Attendant is receiving data from.

Once the client companies have been provisioned in the database for conference management by the client, the next phase of the initialization and provision process is to provision the user(s) that will provide the conference management services for the client. At step 210, the client provides a list of users who would need access to the application as identified operational support staff or administrators to oversee the operational staff. These users are then setup with temporary access to the application (step 212) that is finalized when they log into the system initially.

In one embodiment, the user data includes a listing of operational staff and roles that is used to create the user profile accounts in the database to authorize access and specify what features and functions the user can execute. Once the accounts are loaded, an email may be generated to give the individual users their User Ids and Passwords. A user will be prompted to change their password on their first log into the Conference Attendant tool.

At step 214, a company's web site and content directory is setup on the web server 114 and then the company's URL and DNIS are created to enable the company website to be accessed through the web server 114. A client can have many companies assigned to their client. In this context if all the clients' companies are all setup to a single location then the client record would be utilized to see all conferences. If a client spans multiple geographical regions then the client could have several different URLs to view the companies applicable to each specific geographical region.

A separate web site is established for each client that utilizes the web-based conference management tool. Separate websites per client keep the content separate keep the client's access limited to only their content.

In one embodiment, to maintain security of the conference management application and to restriction access, user setup and provisioning is performed by the Provider. There will be no ability for any client to create or grant access to the system without listing that user with the Provider staff.

Users may be established at different roles and levels. Example roles may include:

Operator=Will have the ability to do a predefined set of functions within the Conference Attendant product and see all data displayed.

Supervisor Operator=Will have the ability to see all data displayed and be able to perform all functions within the Conference Attendant product.

One the system is provisioned for a client and its users, the system can then be used to manage conferences of the client and its companies.

Figure 3:
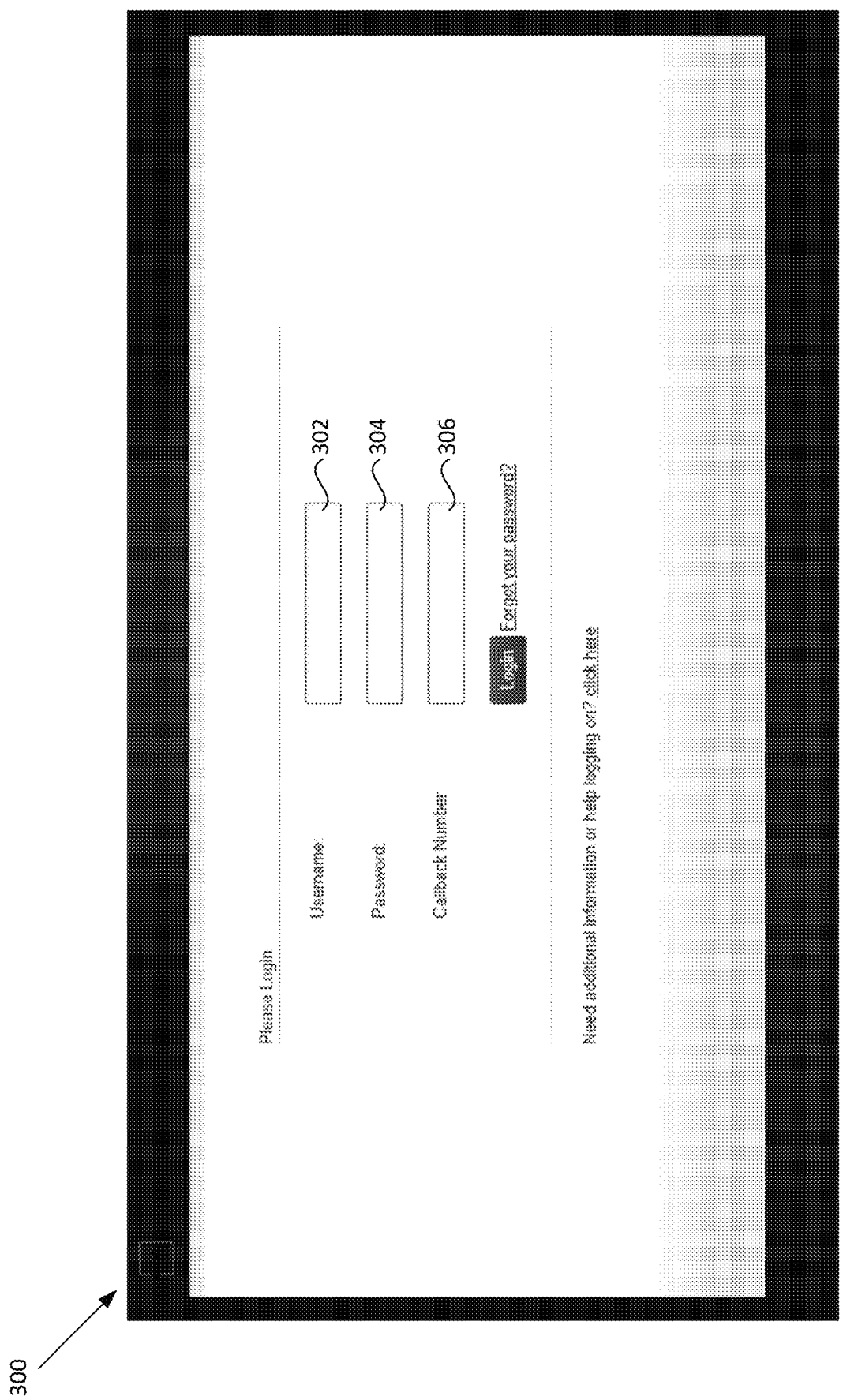
FIG. 3 shows an example login interface.
Figure 4:
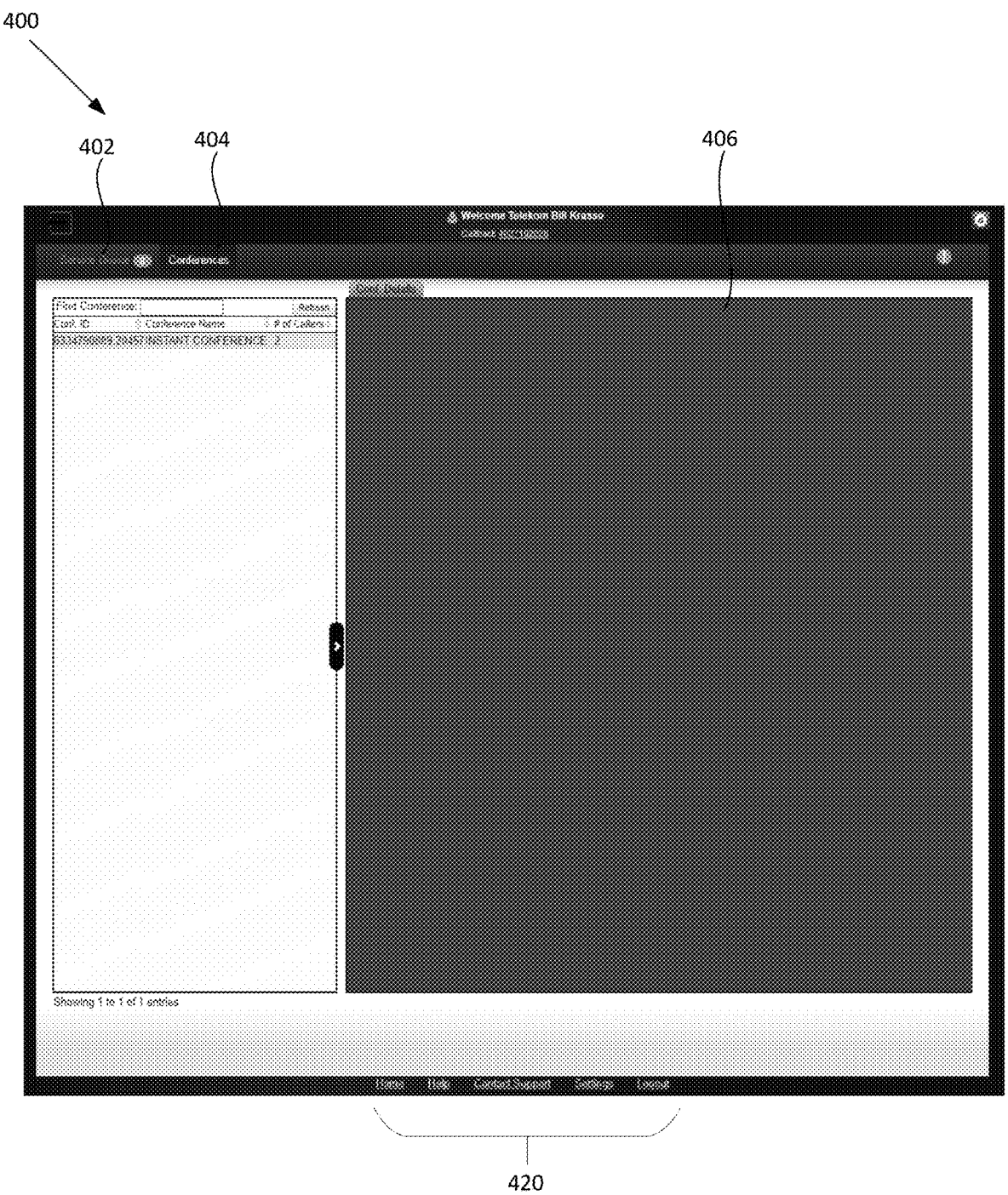
FIG. 4 shows a conference management interface.
Figure 5:
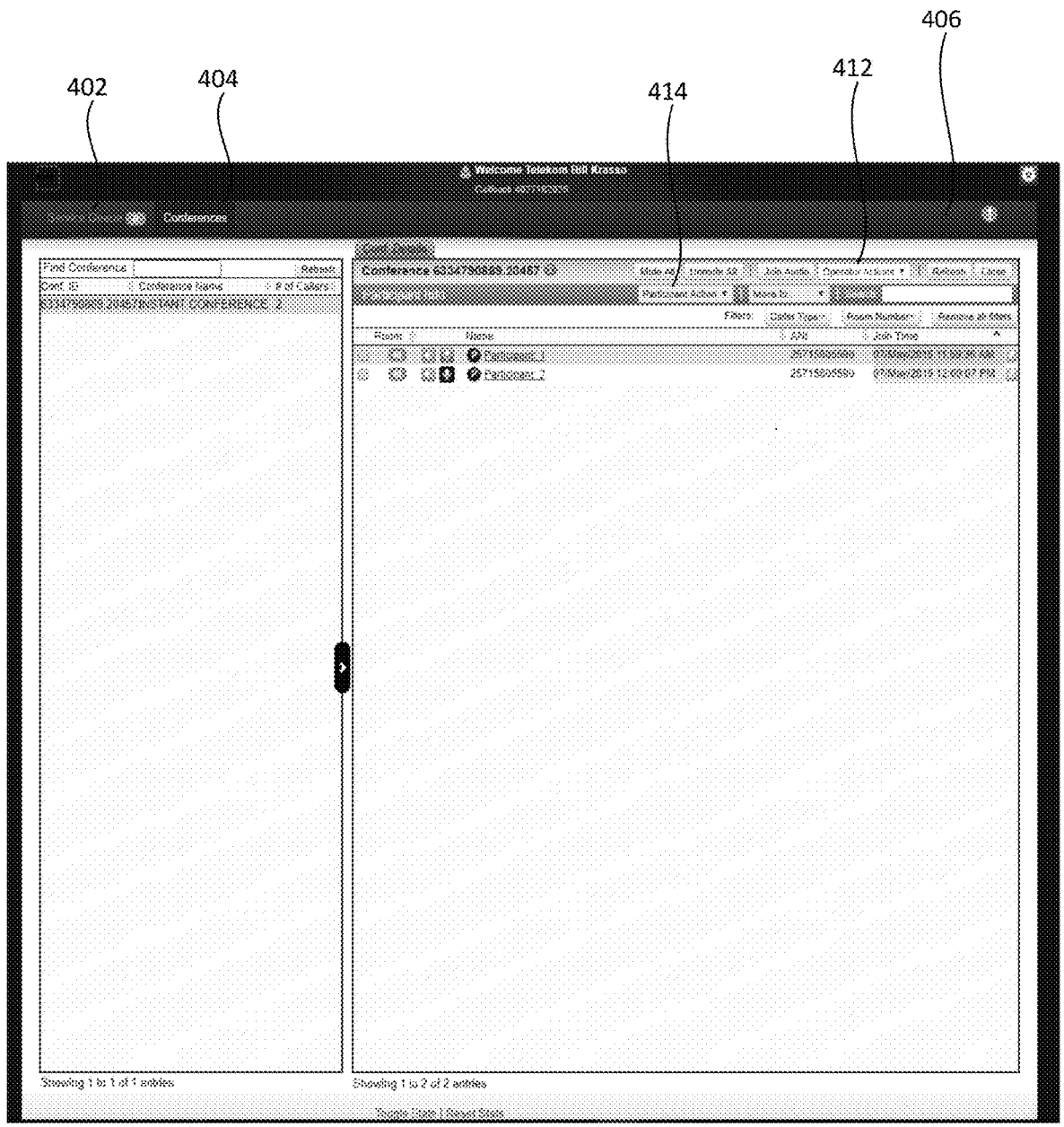
FIG. 5 shows the conference management interface displaying conference data.

The flow for a user, when utilizing the Conference Attendant product, is to type in the URL for the Conference Attendant application which will render a login screen. The users must be validated as being members of the client to have access to the system. The users would only have access to the specific URL authorized by the client. If a client has two URLs, e.g. one in US and one in UK, then the client would designate users to a specific geographical region and therefore, only have access credentials created for that specific URL. An example login screen is shown in FIG. 3. The login screen 300 asks for specific user information that only that user would have; e.g. UserID 302, Temporary Password 304, and Phone number 306 where to receive phone calls while providing operation support. The user on their initial login would be taken to a password change page to enter their new password that would be good for a specific time frame for reset purposes, designated between the Provider and the Client. Once the user has updated their login information and it is saved the user authenticated. A conference management interface of the Conference Attendant application is then generated and presented to the user. An example conference management interface 400 is shown in FIG. 4. The conference management interface 400 presents a listing of the authorized conferences that can be managed based upon the user's login credentials. Authorized conferences are limited to a client, to a specific company, and a specific bridge. The user can also be restricted to a specific audio conference for a specific client, company, and bridge. The flexibility exists to ensure that a single user can only see and access what is authorized at the client level. The client is the highest level. A client can have one to many companies. A company can have only one bridge; however, a client can have one or many bridges depending upon geographical regions. A company can have many users but a user can only have access to a single bridge. A user can have access to one or multiple URLs; however, each URL will require the user to have separate authorization credentials.

There are two tabs available above the list of conferences that show Service Queue and Conferences. The Service Queue 402 is where any help requests for the viewable Conference audio participants would be displayed. The Conference tab 404 shows all the current active conferences for the client as well as the specific data available for the individual conferences such as the name of the conference owner, the start time of the conference, and number of current active participants within the conference. When an operational staff user clicks on a specific conference in the conference list the details for that conference will open within a frame 406 on the right side of the conference tab. When the conference details are rendered, a series of buttons and menus above the conference details will be displaying to enable the operational staff to manage and interact with the specific audio conference. For example, the user may select particular participants and toggle their mute and microphone settings. The user may select from a drop down menu of operator actions 412 or participant specific actions 414. The user may also room conference data including room number, caller types, etc. These example actions are provided for illustrative purposes only. The person skilled in the art will recognize other management functions that may be made available on the management interface.

The Service Queue tab 402 will also have an Icon which will display the number of pending help requests currently waiting. The help requests will remain in the Service Queue for fifteen minutes before the user is notified that their request was not answered, and the request cancelled. There is also a bell signal that will be heard by each operational staff logged into the application to notify them audibly that there are help requests pending. This bell signal will replay each minute until either the request is answered or expires.

Service requests may have an array of service request types requiring different management actions by the user.

In a first example, a request may be from someone in a conference requesting help with an issue in the overall conference. This is generally due to some type of quality issue or conference feature issue and help required. When the request is accepted the operator will be joined directly into the conference and will be shown the Conference Detail page. When the operator disconnects they will be shown as grayed out and at the bottom of the participant list.

In a second example, a request may be from someone in a conference requesting help with an issue for that specific participant only. When the request is accepted the operator will be joined directly into a private conference with that participant and the participant will be shown in the Conference Detail with an Icon of "BRB" in Black on the right side of the participant pane. When the operator disconnects the participant will be rejoined to the conference and the Icon will change back to "Green".

The Conference Attendant interface 400 also contains pages 420 for Help, Settings, Contacts, and Log Out. Access to each page is based upon the different application user types.

The Help page is a text-based page that lists the common information about the application as well as the rules for password makeup rules.

The Settings page allows the user to define how they will hear both the bell sounds and the audio voice for their specific connection. The settings can be automatic so that the application choses where to play the sounds to; e.g. either to computer speakers, headset speakers, or the phone.

The Contact page lists the phone numbers and email address defined by the client for any questions about support or to contact their internal support staff.

The Log Out page disconnects the users from the application and terminates their application session.

Conference Attendant utilizes Secure Socket Layer and utilizes a hash code algorithm on user passwords that is one-hundred twenty-eight bits and thirty-two hexadecimal character string that is a combination of alpha and numeric values that is very difficult if not possible to decrypt to the original string value.

The Conference Attendant management tool can support all conferences on all bridges of a Provider.

Each Provider bridge required must be added to the configuration security and management rules which allows the Provider operators to see all conferences and all companies on a single bridge selected at login. However, when a company has the Conference Attendant product all the conferences associated with that company will no longer be viewable within the current operator tool for the Provider operators. Instead, the company will need to provide all the first level operational support for their company conferences. Additional support at a higher level can be provided by operational support staff 130 (FIG. 1)

A range of functions and features may be implemented by the Conference Attendant user for a company. Example features include:

Name Display

Conference Attendant functionality allows the operator to change the name of a participant within a conference. When the name is changed the UI will show the participant's name in lieu of the Participant: 1 as long as the conference is active. When the operator changes the name in the UI view it also sends a JMS message that updates the name on conference logs for future sending of the name as part of the CDR data. The name will be passed via JMS to the Conference Attendant UI which will display the captured name in lieu of the participant identification number; e.g. Participant: 1 as seen today in Conference Attendant. The operational staff will be able to change the Participant: 1 to an appropriate name that will then appear on the client's invoices.

Recorded Name Playback

This feature allows the operator to play the recorded name of a participant. When a company, account, or owner has Name Record enabled there is a .wav file of that recording created for playback by the Roll Call Feature. This will extend the capability for the operator to play that .wav file to their individual line only. This will allow the operator to validate the name that appears in the UI with the name recorded and/or change the name appropriately. The UI will have a button that will allow the operator to select a participant and play the associated name wav file.

Start Conference Recording

Typically, a recording can only be started via a Web UI product; e.g. IUM or RCM, via DTMF by the leader, or having the recording automatically start based upon provisioning settings. This feature will add the capability for the Conference Attendant UI to allow the operator to start a recording for a given conference in lieu of the leader having to start the recording. There will be a Recording Button in the UI on the Conference Detail Page. The operator will be able to start, pause, or stop the recording at any time during the conference. This will enable the conference to continue without interruptions or distraction of the leader and allow the operator to either record or stop recording based upon subject or events in the conference.

Entry/Exit Announcements

There will be an Notifications Drop-Down that will show Entry Notifications and Exit Notifications. The Notifications will be on the Conference Detail Page. The Entry Notifications will show Host and Participant Entry Notifications. For the Host there will be a listing of Tone, Names, Names and Tone, and Nothing. For the Participant there will be a listing of Tone, Names, Names and Tone, and Nothing. The Exit Notifications will show Host and Participant Exit Notification. For each Host there will be a listing of Tone, Names, Names and Tone, and Nothing. For each Participant there will be a listing of Tone, Names, Names and Tone, and Nothing. There will be the ability within the Conference Attendant UI to allow the operator to change or set the Entry/Exit announcements for a conference in lieu of the leader.

Figure 6:
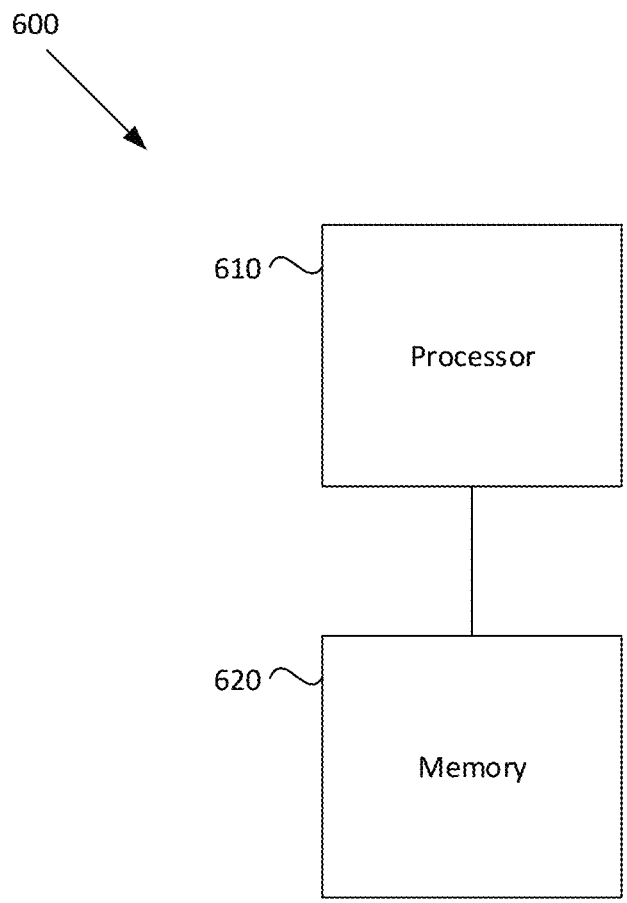
FIG. 6 shows a processor and memory on which computer executable instructions may be executed.

The conference management application may be implemented in software, hardware, firmware or a combination of software, hardware and firmware. In a hardware embodiment 400 depicted in FIG. 6, a provisioning module may include at least one processor 610 and at least one operatively associated memory 620. The memory 620 may store software and/or instruction sets for execution by the processor 610. The memory 620 may include both random access memory for use in executing instruction sets as well as memory for storing the instructions and any data associated with the process, such as user data, company data, conference data, etc. In one particular embodiment, the memory 620 may store instructions that, when executed by the processor, cause the processor to provision client and user data that can be used to generate a conference management interface pertaining to the client and user data.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for providing conference management for a client of a conference services provider, the method comprising:
   initializing a client database of the conference services provider to identify one or more companies within the database that are to have conferences managed by the client instead of the conference services provider;
   provisioning, in the client database, one or more users from the client;

receiving a login request from a user, the login request comprising user credentials;

determining from the user credentials that the user is associated with one or more companies; and generating an interface that displays a management interface for one or more conferences on a bridge associated with the one or more companies associated to the user, wherein the interface allows the user to perform one or more management actions for the one or more conferences.

2. The method of claim 1 comprising displaying on the interface one or more help requests from one or more participants of the one or more conferences.

3. The method of claim 1 wherein the login request comprises a user indication of one or more bridges for which conferences are to be displayed on the management interface.

4. The method of claim 1 wherein the login request comprises a URL specific to the client.

5. The method of claim 4 wherein the user credentials are based on the URL.

6. The method of claim 1 comprising eliminating access for operational staff to provide management functions for conferences of the one or more companies.

7. The method of claim 1 wherein each company is on a single home bridge within a geographical region.

8. A system for providing conference management for a client of a conference services provider, the system comprising:

at least one client database;

at least one processor and operatively associated memory that are programmed to:

initialize the client database of the conference services provider to identify one or more companies within the database that are to have conferences managed by the client instead of the conference services provider; and provision, in the client database, one or more users from the client; and at least one web server configured to:

receive a login request from a user, the login request comprising user credentials;

determine from the user credentials that the user is associated with one or more companies; and generate an interface that displays, for the user, a management interface for one or more conferences on a bridge associated with the one or more companies associated to the user, wherein the interface allows the user to perform one or more management actions for the one or more conferences.

9. The system of claim 8 wherein the interface is configured to display one or more help requests from one or more participants of the one or more conferences.

10. The system of claim 8 wherein web server is programmed to determine, from the login request, a user indication of one or more bridges for which conferences are to displayed on the management interface.

11. The system of claim 8 wherein the login request comprises a URL specific to the client.

12. The system of claim 11 wherein web server is programmed to determine the user credentials based on the URL.

13. The system of claim 8 wherein the at least one processor and memory are programmed to eliminate access for operational staff to provide management functions for conferences of the one or more companies.

14. The system of claim 8 wherein each company is on a single home bridge within a geographical region.

15. A non-transitory computer readable medium comprising instructions, that when executed by a processor, cause the processor to perform:

initializing a client database of the conference services provider to identify one or more companies within the database that are to have conferences managed by the client instead of the conference services provider;

provisioning, in the client database, one or more users from the client;

receiving a login request from a user, the login request comprising user credentials;

determining from the user credentials that the user is associated with one or more companies; and generating an interface that displays a management interface for one or more conferences on a bridge associated with the one or more companies associated to the user, wherein the interface allows the user to perform one or more management actions for the one or more conferences.

16. The non-transitory computer readable medium of claim 15 comprising instructions, that when executed cause the processor to perform displaying on the interface one or more help requests from one or more participants of the one or more conferences.

17. The non-transitory computer readable medium of claim 15 wherein the login request comprises a user indication of one or more bridges for which conferences are to be displayed on the management interface.

18. The non-transitory computer readable medium of claim 15 wherein the login request comprises a URL specific to the client.

19. The non-transitory computer readable medium of claim 18 wherein the user credentials are based on the URL.

20. The non-transitory computer readable medium of claim 15 wherein each company is on a single home bridge within a geographical region.

* * * * *